(12) United States Patent
Cuciurean-Zapan et al.

(10) Patent No.: US 7,742,658 B2
(45) Date of Patent: Jun. 22, 2010

(54) SYSTEM AND METHOD FOR BOUNDARY ARTIFACT ELIMINATION IN PARALLEL PROCESSING OF LARGE FORMAT IMAGES

(75) Inventors: Clara Cuciurean-Zapan, Fairport, NY (US); Ramesh Nagarajan, Pittsford, NY (US); Ammal Malik, Webster, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 881 days.

(21) Appl. No.: 11/340,391

(22) Filed: Jan. 26, 2006

(65) Prior Publication Data

US 2007/0172149 A1 Jul. 26, 2007

(51) Int. Cl.
*G06K 9/36* (2006.01)

(52) U.S. Cl. ................... 382/284; 382/304

(58) Field of Classification Search ................ 382/284, 382/303, 304, 275; 358/3.03
See application file for complete search history.

(56) References Cited

U.S. PATENT DOCUMENTS

| | | | |
|---|---|---|---|
| 4,958,236 A | 9/1990 | Nagashima et al. |
| 5,008,950 A | 4/1991 | Katayama et al. |
| 5,293,430 A | 3/1994 | Shiau et al. |
| 5,323,232 A | 6/1994 | Otaka et al. |
| 5,754,710 A | 5/1998 | Sekine et al. |
| 5,818,964 A | 10/1998 | Itoh |
| 5,850,474 A | 12/1998 | Fan et al. |
| 5,959,290 A | 9/1999 | Schweid et al. |
| 6,130,966 A | 10/2000 | Sekine et al. |
| 6,240,205 B1 | 5/2001 | Fan et al. |
| 6,259,823 B1 | 7/2001 | Lee et al. |
| 6,282,325 B1 | 8/2001 | Han |
| 6,285,464 B1 | 9/2001 | Katayama et al. |
| 6,343,159 B1 | 1/2002 | Cuciurean-Zapan et al. |
| 6,477,282 B1 | 11/2002 | Ohtsuki et al. |
| 6,594,401 B1 | 7/2003 | Metcalfe et al. |
| 6,608,701 B1 | 8/2003 | Loce et al. |
| 6,683,702 B1 | 1/2004 | Loce et al. |

(Continued)

FOREIGN PATENT DOCUMENTS

EP 1583064 10/2005

(Continued)

OTHER PUBLICATIONS

Farzin Aghdasi and Rabab K. Ward, Reduction of Boundary Artifacts in Image Restoration, IEEE Transactions on Image Processing, vol. 5, No. 4, Apr. 1996, pp. 611-618.*

(Continued)

*Primary Examiner*—Jon Chang
(74) *Attorney, Agent, or Firm*—Duane C. Basch; Basch & Nickerson LLP

(57) ABSTRACT

The disclosed systems and methods pertain to the processing of large format images in a manner to avoid introducing imaging defects, and more particularly to dividing the large image into bands, processing these bands in parallel and then putting them back together in to create the final processed image. The methods include the use of overlapping the image bands, padding of the bands prior to processing and the redefinition of image values at common boundaries of the bands to minimize or eliminate visible defects.

19 Claims, 11 Drawing Sheets

U.S. PATENT DOCUMENTS

| | | | |
|---|---|---|---|
| 6,771,832 B1 | 8/2004 | Naito et al. | |
| 6,873,437 B1 | 3/2005 | Kuwahara et al. | |
| 6,975,434 B1* | 12/2005 | Pilu et al. | 358/474 |
| 7,079,289 B2 | 7/2006 | Loce et al. | |
| 7,372,992 B2 | 5/2008 | Ohshita | |
| 7,440,139 B2 | 10/2008 | Loce et al. | |
| 7,460,276 B2 | 12/2008 | Xu et al. | |
| 2002/0181797 A1 | 12/2002 | Young | |
| 2003/0043210 A1* | 3/2003 | Hanks | 345/838 |
| 2003/0090729 A1 | 5/2003 | Loce et al. | |
| 2004/0114814 A1 | 6/2004 | Boliek et al. | |
| 2004/0257623 A1* | 12/2004 | Suzuki | 358/3.03 |
| 2005/0025374 A1 | 2/2005 | Ishikawa | |
| 2006/0077489 A1 | 4/2006 | Zhang et al. | |
| 2006/0115182 A1* | 6/2006 | Deng et al. | 382/284 |
| 2006/0132847 A1 | 6/2006 | Xu et al. | |
| 2006/0228035 A1 | 10/2006 | Ishikawa | |
| 2006/0232798 A1 | 10/2006 | Xu et al. | |
| 2007/0053003 A1 | 3/2007 | Loce et al. | |
| 2007/0103731 A1 | 5/2007 | Tse et al. | |
| 2007/0109602 A1 | 5/2007 | Tse et al. | |
| 2007/0172148 A1* | 7/2007 | Hawley | 382/281 |
| 2007/0258101 A1 | 11/2007 | Nagarajan et al. | |
| 2008/0049238 A1 | 2/2008 | Nagarajan et al. | |

FOREIGN PATENT DOCUMENTS

GB  2291308  1/1996

OTHER PUBLICATIONS

He, Z.; Chang, T.; Allebach, J.; Bouman C.; Boundary Stitching Algorithm for Parallel Implementation of Error Diffusion; Xerox Corporation.

An unofficial file history of U.S. Appl. No. 11/340,380 between Nov. 17, 2008 and Nov. 10, 2009.

He, Z.; Chang, T.; Allebach, J.; Bouman C.; Boundary Stitching Algorithm for Parallel Implementation of Error Diffusion; Xerox Corporation, 2004.

Unofficial Partial File History for U.S. Appl. No. 11/126,970 as of Dec. 8, 2008.

Unofficial Partial File History for US Patent 7440139.

Unofficial Partial File History for US Patent 7460276.

Unofficial Partial File History for U.S. Appl. No. 10/923,116 as of Dec. 9, 2008.

Unofficial Partial File History for U.S. Appl. No. 11/104,758 as of Dec. 9, 2008.

Unofficial Partial File History for U.S. Appl. No. 11/218,966 as of Dec. 9, 2008.

Unofficial Partial File History for U.S. Appl. No. 11/272,182, as of Oct. 6, 2008.

Unofficial Partial File History for U.S. Appl. No. 11/340,380 as of Nov. 17, 2008.

Unofficial Partial File History for U.S. Appl. No. 11/281,267 as of Oct. 8, 2008.

Unofficial Partial File History for U.S. Appl. No. 11/268,147 as of Oct. 8, 2008.

Unofficial Partial File History for U.S. Appl. No. 11/467,584 as of Oct. 8, 2008.

Unofficial Partial File History for U.S. Appl. No. 11/272,182, as of Feb. 10, 2009.

Unofficial Partial File History for U.S. Appl. No. 11/281,267 as of Jan. 27, 2009.

* cited by examiner

SYSTEM AND METHOD FOR BOUNDARY ARTIFACT ELIMINATION IN PARALLEL PROCESSING OF LARGE FORMAT IMAGES

The disclosed systems and methods pertain to the processing of large format images in a manner to avoid introducing imaging defects, and more particularly to dividing the large image into bands, processing these bands in parallel and then putting them back together in to create the final processed image.

BACKGROUND AND SUMMARY

Digital image processing of large format images is often done in parallel for cost efficiency, speed, and reuse of systems (hardware as well as software and image processing algorithms) utilized for processing standard size documents. For instance, wide format scanners need to handle input documents that are up to 36 inches wide or more. In order to make use of existing image processing systems that are designed for regular-size documents (smaller sizes usually up to a maximum of 12 inches wide), or to perform parallel processing to achieve performance goals, it is desirable to divide the input documents into several segments, perform image processing on the segments separately and then stitch the results together at the end to produce a resulting image or document.

However, simply stitching several processed image segments together results in a visible defect at the common boundary(s) and "depletion" artifacts. These artifacts are especially visible when binary (already rendered) parts of the document are put together directly and/or when scanning and printing resolutions differ. A classic example is stitching of two error-diffused images together, where there arises an obvious artifact at the common boundary, as depicted in FIG. 12. There are at least two problems with the image—the artifact at the common image boundary and the "depletion" artifact at the top and bottom of the boundary region, and image boundaries. Artifacts are also visible when anamorphic printing resolutions are used to print the stitched document, such as the case of solid ink printing.

Alternatively, if rendering were performed after stitching the individual segments together, then the rendering module would be expensive because of the memory requirements for processing the larger image portions. Hence, the disclosed systems and methods are directed to various alternative embodiments to reduce the visibility of defects when processing large format images, without increasing the cost of the image-processing pipeline or hardware.

A straightforward method to avoid boundary artifacts is to keep an error buffer with error values at the right edge of the left image and use these error values for the left side of the right image as taught in U.S. Pat. No. 6,282,325 for "Image Processing Technique for Binarizing an Image Scanned by a Shuttle Type Scanner," issued Aug. 28, 2001 to Ji-Hoon Han, and U.S. Pat. No. 4,958,236 for an "Image Processing Method and Apparatus Therefor," by Nao Nagashima, et al., issued Sep. 18, 1990. Such a method could be fairly costly, however, and requires specialized hardware and complicated image manipulation.

Another method to avoid or reduce artifacts is to modulate the error diffusion threshold at the boundary as disclosed by Zhen He et al., in "Boundary Stitching Algorithm for Parallel Implementation of Error Diffusion", pp. 344-355, in Color Imaging IX: Processing, Hardcopy, and Applications, (Reiner Eschbach, Gabriel G. Marcu editors), held in San Jose, Calif., Volume 5293, No. 5293, published by SPIE and IS&T in 2004. This method requires a specialized threshold modulation circuit.

Generally, the depletion artifact causes corners to be rounded and dots to be "aligned". This defect type may be avoided by using a different threshold in highlight regions as taught in U.S. Pat. No. 6,285,464 for an "Apparatus and Method for Producing a Half-tone Image," by Akihiro Katayama, et al., issued Sep. 4, 2001. U.S. Pat. No. 4,958,236 proposes parallel processing by dividing the image into equally overlapping or overlapping to the left/right only segments, and also passing the error to the next band. This method requires scanline buffers storing video data.

The systems and methods disclosed herein tackle all of the noted problems, and further improve the resultant images by manipulation of the large image's parts (segments). The disclosed systems and method further avoid the difficult processing associated with diffusing error to an adjacent band. In a general sense, the disclosed embodiments include dividing the large image into bands in particular ways, processing these bands in parallel and then putting them back together in an optimal way to create the final processed image. The methods described herein include a combination of some, or all, of the following operations:
 1. Overlapping the image bands;
 2. Padding the bands with different values and images;
 3. Redefining the binary values at the common boundary of the bands.

Disclosed in embodiments herein is a method for processing an image, comprising: dividing the image into bands; adding to each band additional image data not found in the band; processing the bands to produce processed bands; and recombining the processed bands to produce a processed image.

Also disclosed in embodiments herein is a method for processing a large-format image, comprising: dividing the large format image into N bands; adding to each of said N bands, along at least an edge additional image data not found in said band; processing each of said N bands to produce N processed bands, wherein said N processed bands each include processed image values derived from the additional image data; and recombining the processed bands while eliminating overlapping regions thereof to produce a processed image.

Further disclosed in embodiments herein is a system for processing an image, comprising: an image splitter for dividing the image into bands, each of said bands assigned to a dedicated processing channel; within the channel adding to each band, additional image data not originally found in the band; an image processor for processing all the image data in each band to produce processed bands; and an image stitcher for recombining the processed bands to produce a processed image.

DETAILED DESCRIPTION

The methods described herein include a combination of one or more of the following operations designed to eliminate artifacts and defects in a processed image:
1. Overlapping the image bands;
2. Padding the bands with different values and images;
3. Redefining the binary values at the common boundary of the bands.

Figure 1:
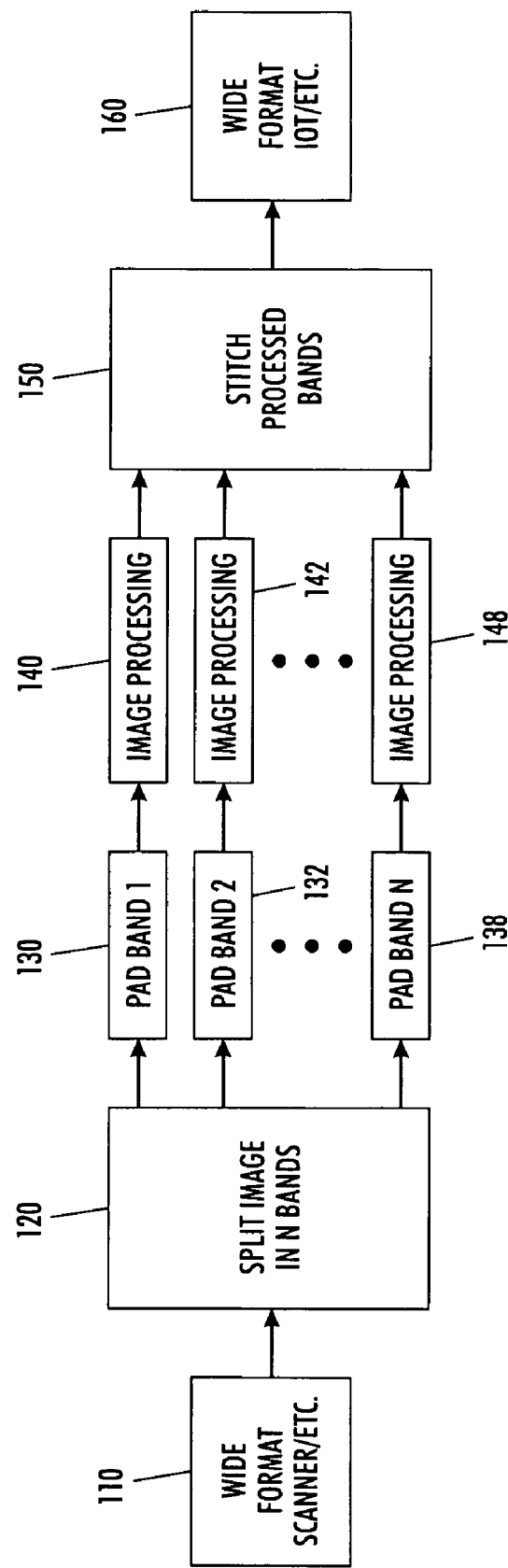
FIG. 1 is an illustrative example of a system suitable for executing the methods disclosed in various embodiments herein.
Figure 2:
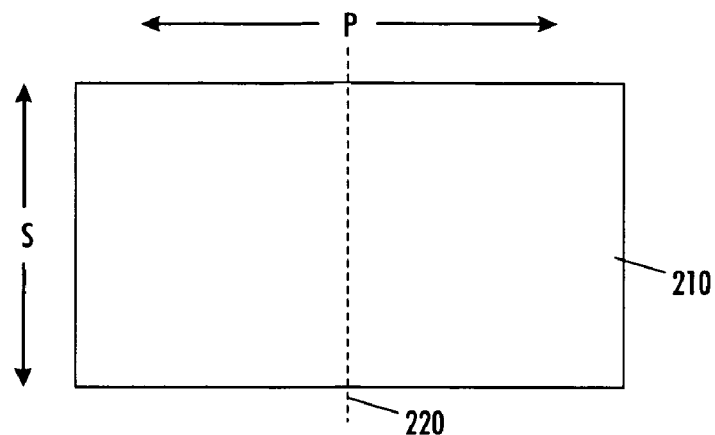
FIG. 2 is a simplified view of an input image.
Figure 3:
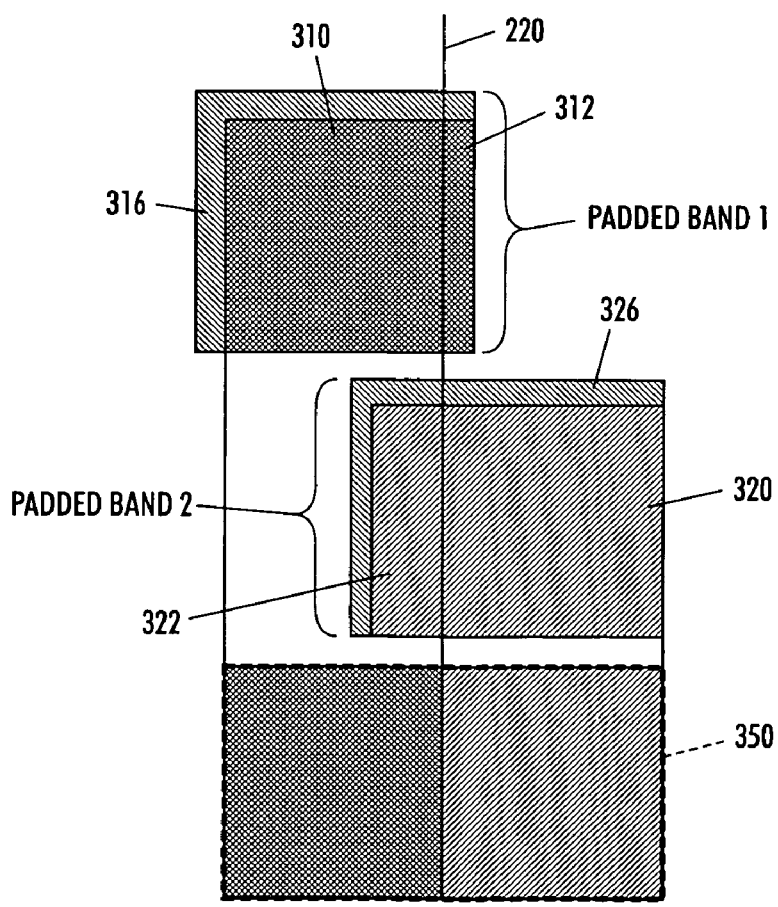
FIG. 3 is an exemplary view of a method in which an image is processed in accordance with an embodiment disclosed herein.

Referring to FIG. 1, depicted therein is an exemplary image processing path implementing the system and methods disclosed herein. Considering a first embodiment, there is disclosed a specific method for stitching together error diffused images. The image is first segmented or divided in overlapping areas. These areas can be overlapping or not. More specifically, the big image is divided in a number of unequally or equally overlapping segments called bands. Referring to FIGS. 2 and 3, just two image bands will be shown for purposes of illustration for all methods, however, the various embodiments will work for any number of bands. Specifically, FIG. 2 illustrates an original image 210, that is P-pixels by S-scanlines, and which, for example, may be split in half along the line 220. Then two bands may be created. The first band may be the first half of the original image (region 310 in FIG. 3) extended into the second half by amount A (region 312 in FIG. 3), and the second band maybe the second half of the original image (region 320 in FIG. 3) extended into the first half by amount B (region 322 in FIG. 3). Amounts A and B may be equal or unequal in accordance with the various embodiments disclosed herein.

Although it will be appreciated that the present embodiments may be applied to various systems suitable for carrying out various image processing operations, the following discussion will be directed, in large part, to a discussion of error-diffusion of large-format images. Accordingly, the particular embodiments characterized will include specific examples of error-diffusion processing and the requisite steps to overcome defects that are prevalent in error-diffused images. Such embodiments are not, however, intended to limit the scope to large format images.

Referring also to FIG. 3, there is depicted a first method to process image 210. The system and method, as depicted in FIGS. 1 and 3, includes:
1. Padding the top and left of each band with a pattern to avoid "depletion" artifacts;
2. Render (error diffuse) all padded bands; and
3. Recompose the image (e.g., FIG. 4).

More specifically, a wide format scanner 110 is used to generate an image. Scanner 110 operates as an image source, but it will be appreciated that various alternative devices may be used to produce such images, including cameras and other digital technologies. It is also contemplated that the source of images may include a storage device or network upon which an image file is placed prior to processing/rendering.

Subsequent to receiving the image, which may be stored temporarily in a memory, the image is split at 120 into a plurality of N overlapping or nonoverlapping bands, each of which may be processed in a dedicated channel within the system. If overlapping, the bands may be equally or unequally overlapping. Subsequent to splitting the image into bands, the bands are padded or otherwise prepared for processing in accordance with one or the embodiments set forth herein. For example, as illustrated in FIG. 3, the adjacent bands 310 and 320, are padded along regions 316 and 326, respectively (Padded Bands, 1 and 2, respectively). One skillful in the art of image processing will further appreciate that one aspect of the disclosed systems and methods contemplates that the amount of overlap/padding is different for adjacent bands so as to further avoid the introduction of defects.

Returning to FIG. 1, once the bands 130-138 (bands 1-N) are divided from the image, then the individual bands are operated upon by the image processing stages (140-148). Here again, it should be appreciated that the image processing may be carried out in dedicated hardware, either in a series process, where each band is passed through the hardware, or as a parallel set of processes operating on equivalent hardware devices (e.g., multiple image processing systems to carry out stages 140-148). In one embodiment, a system capable of performing the described function would include an image splitter for dividing the image into overlapping or non-overlapping bands, each of said bands assigned to a dedicated processing channel, and within the channel circuitry for adding or injecting into each band, additional image data not originally found in the band. The system further includes a dedicated image processor or image processing circuitry for processing the image data in each band to output processed bands, followed by logic (and registers or similar memory devices), for recombining or stitching the processed bands together to produce a processed image. The present invention contemplates the various operations being carried out with conventional hardware and systems that are currently used for the storage, processing and output of images, including systems such as digital scanners, copiers, and multifunction devices, as made or distributed by Xerox Corporation. Although characterized as image processing circuitry or hardware, the disclosed system is not limited to dedicated image processing hardware or circuitry, and may include serial or parallel image processing operations carried out by conventional computational resources under software control.

Subsequent to the image processing operations being completed for each of the several bands N, the processed bands, which include the processed image data, are then recombined to produce a processed image. The recombination is reflected by the stitching operation 150 in FIG. 1. A simplified view of the recombination is depicted in FIG. 3, where the processed bands 310 and 320 are recombined into image 350. For example, at the left of the split line 220, image 350 has the values of processed band 310. At the right of the split line 220, image 350 has the values of processed band 320. The processed image may then be stored and/or rendered by a wide format image output terminal (IOT) or similar rendering device 160.

In one embodiment, acceptable results using the system/method of FIG. 1 are obtained by using for padding (in regions 316 and 326 of FIG. 2) either a uniform gray value (e.g., close to black), or an on/off pattern of mid-gray values. The padding may be done on the fly in a preprocessing module (130-138) before the band data gets into any of the image processing modules (140-148).

Figure 4:
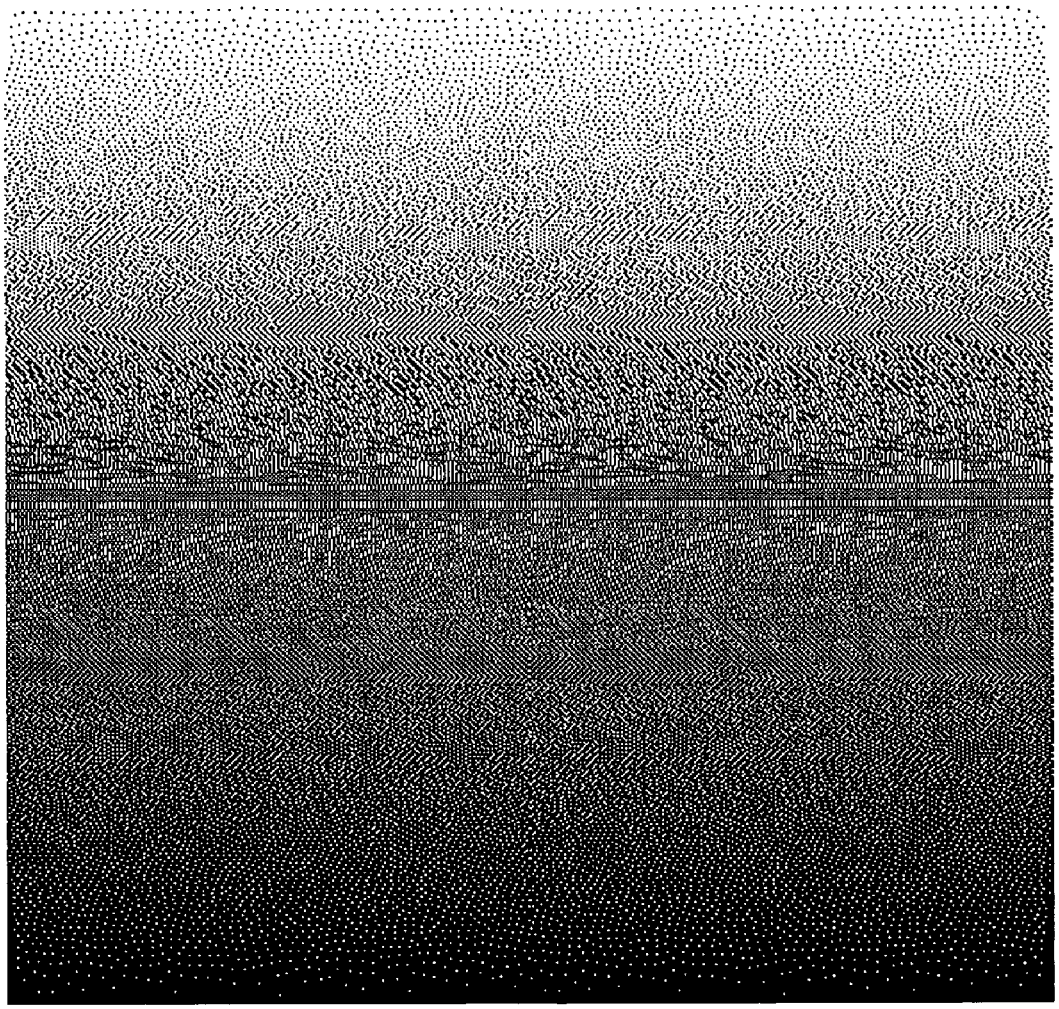
FIG. 4 is an illustrative example of the results of processing an image in accordance with the method illustrated in FIG. 3.
Figure 12:
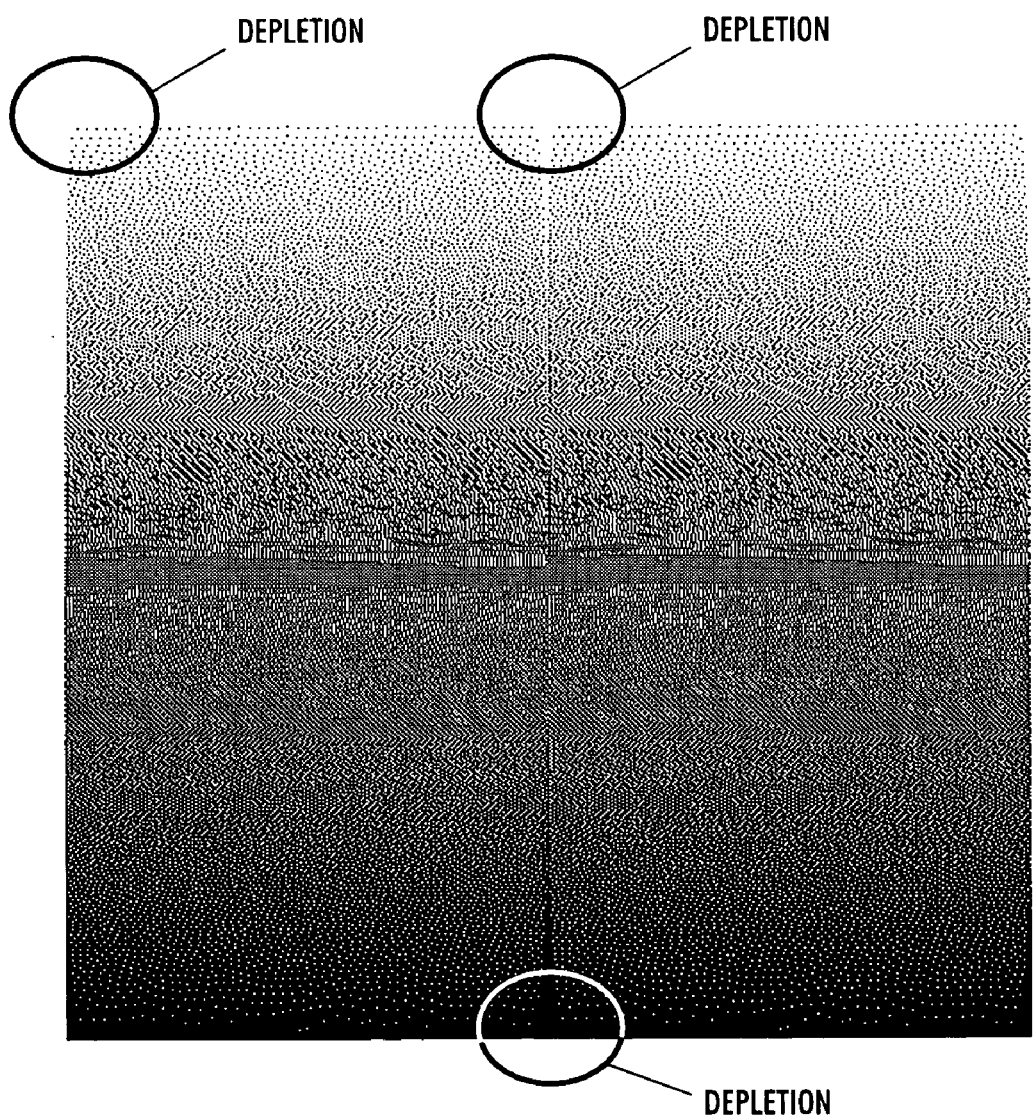
FIG. 12 is an illustrative example of an image processed in accordance with prior art techniques.

Processing an image in the manner characterized in FIG. 3, results in an image as depicted in FIG. 4. As one will observe by comparison, the depletion found in the prior art of FIG. 12 processing method disappears. Although the disclosed method does not totally eliminate the artifacts in the midtone regions, it visibly improves the boundary artifacts overall and reduces depletions.

Figure 5:
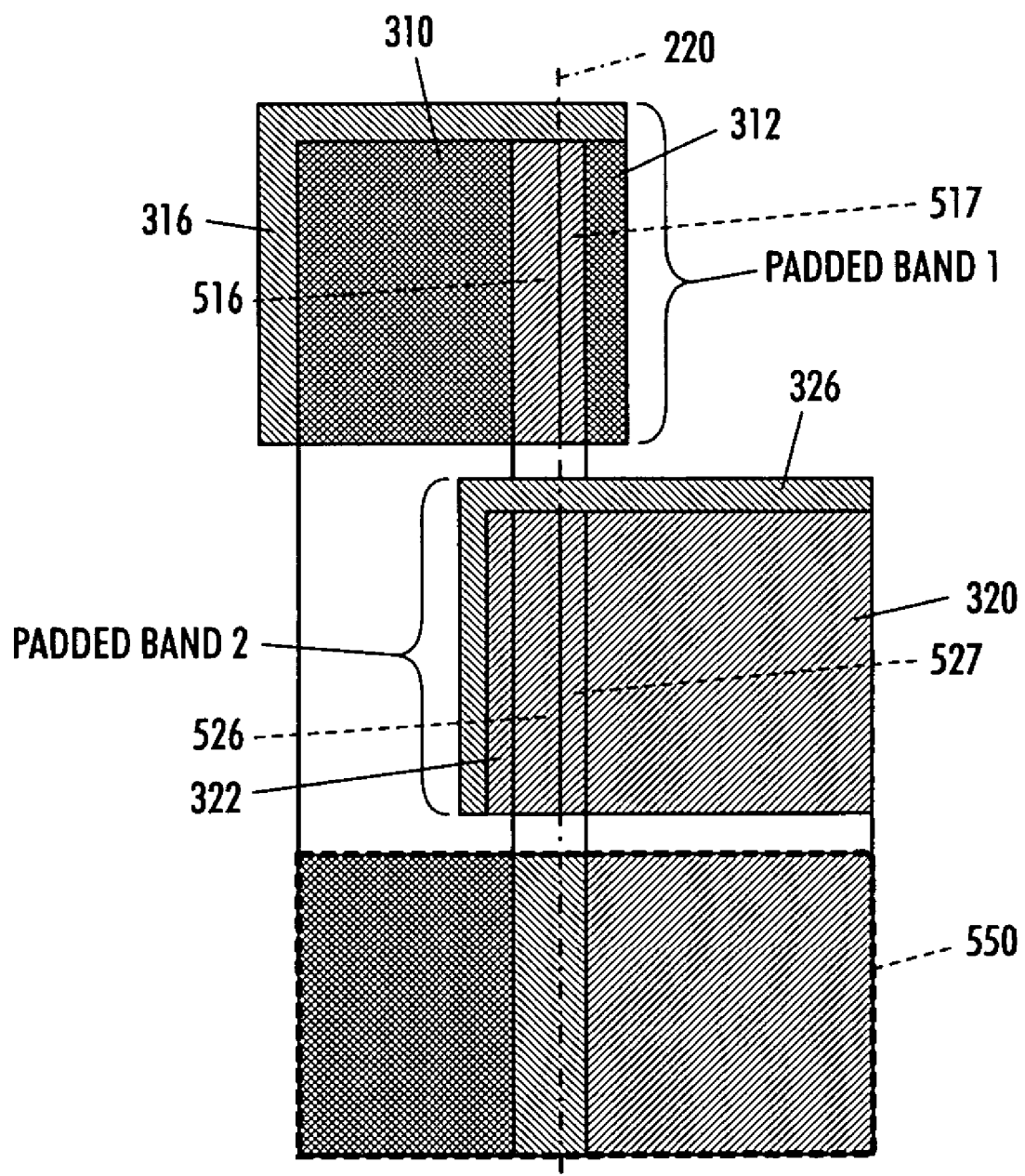
FIGS. 5-7 are exemplary views of alternative embodiments of the processing methods disclosed herein.

In an alternative embodiment, as depicted in FIG. 5, the method described above is further modified. More specifically, the process includes:

1. Padding the top and left of each band, including edges where adjacent bands are present, with a pattern to avoid "depletion" artifacts;
2. Render (error diffuse) all padded bands; and
3. Recompose the image, as represented by image 550 the bottom of FIG. 5, but redefine the values in an area around the common boundary line 220 by randomly selecting from one of the corresponding left side band values (region 516 or 526) or one of the corresponding right side band values (regions 517 or 527.

This approach produces a resultant image having a level of quality similar to that described with respect to the first embodiment above.

Figure 6:
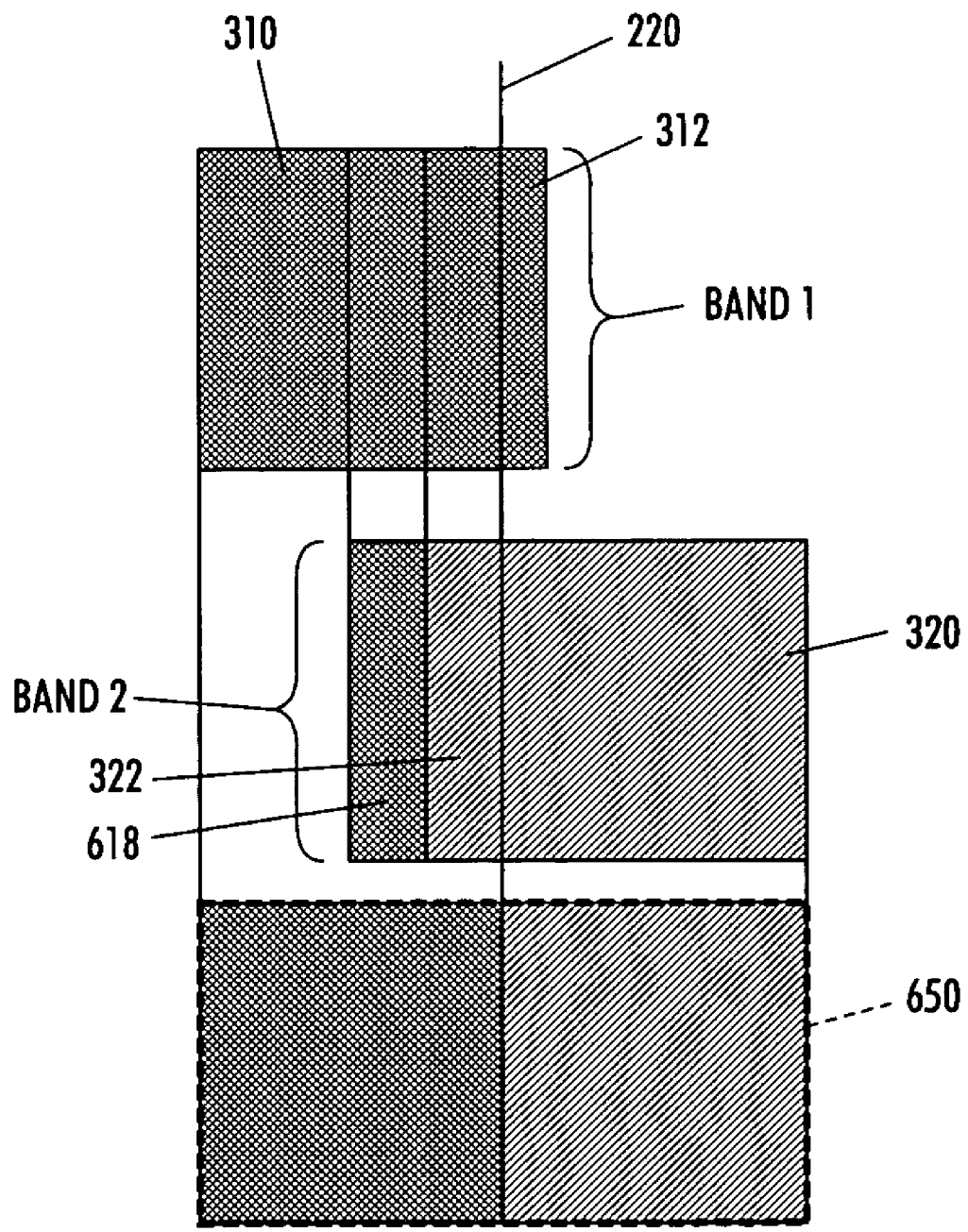
Figure 7:
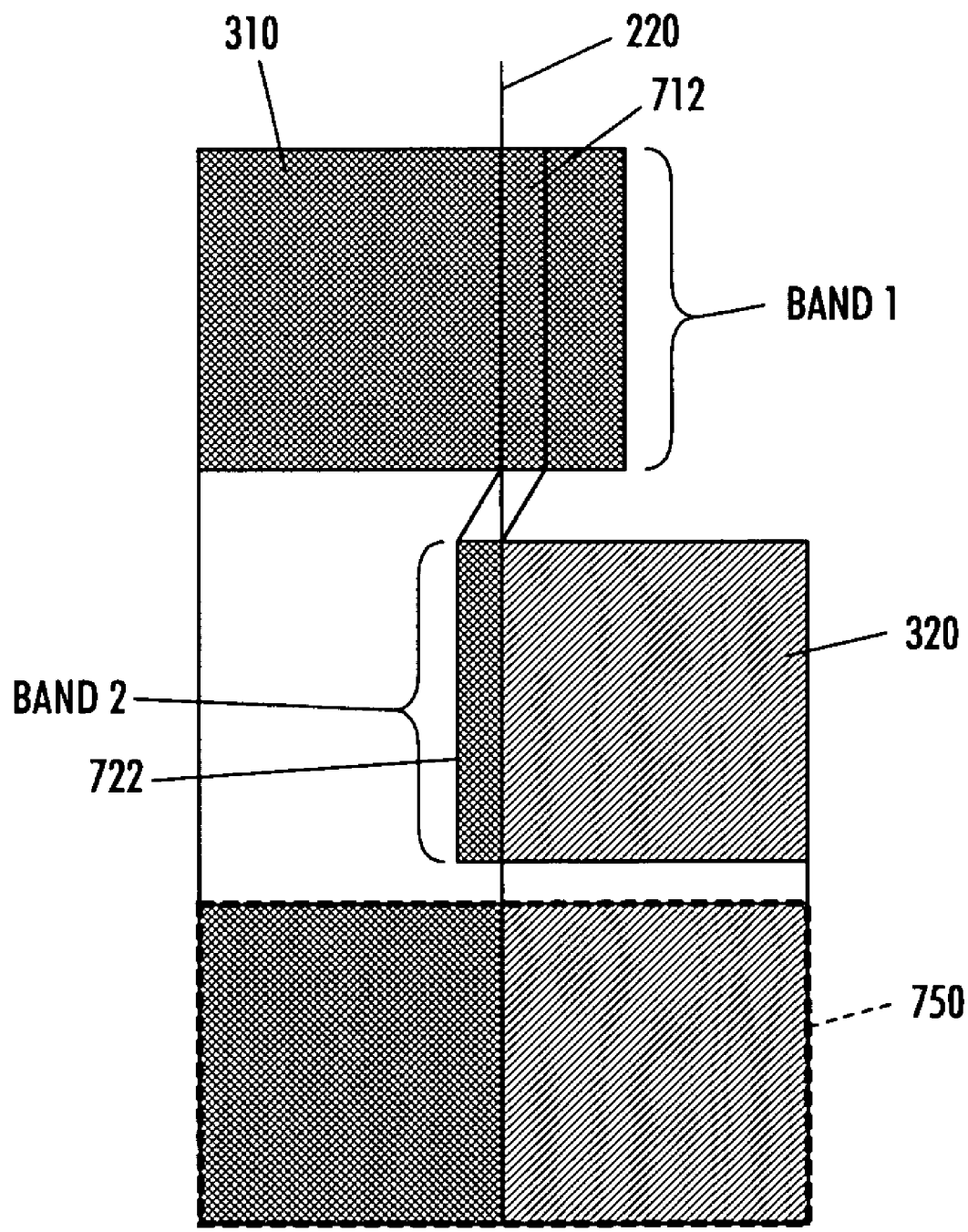

Yet another embodiment is set forth in FIGS. 6 and 7, where two variations are set forth. Moreover, both variants of this embodiment may also be combined with padding as set forth above, or padding may be done all around the bands. More specifically, the processes include:

1. Rendering (e.g., error diffusing) the first few scan lines (e.g., two scan lines) of a first band;
2. Storing, in memory (or delay register/pipeline), at least a portion of the scan lines processed in the previous step, where the stored information may be multi-bit error diffused data;
3. Padding the next band, with selected rendered values of the previous band as stored (as soon as they become available from processing in the prior step);
4. Further padding the top and left of each band with a pattern to avoid "depletion" artifacts (for simplicity not shown in FIGS. 6 and 7);
5. Rendering (e.g., error diffusing) all of the image bands to completion; and
6. Recomposing the image as shown in FIGS. 6 and 7.

Figure 8:
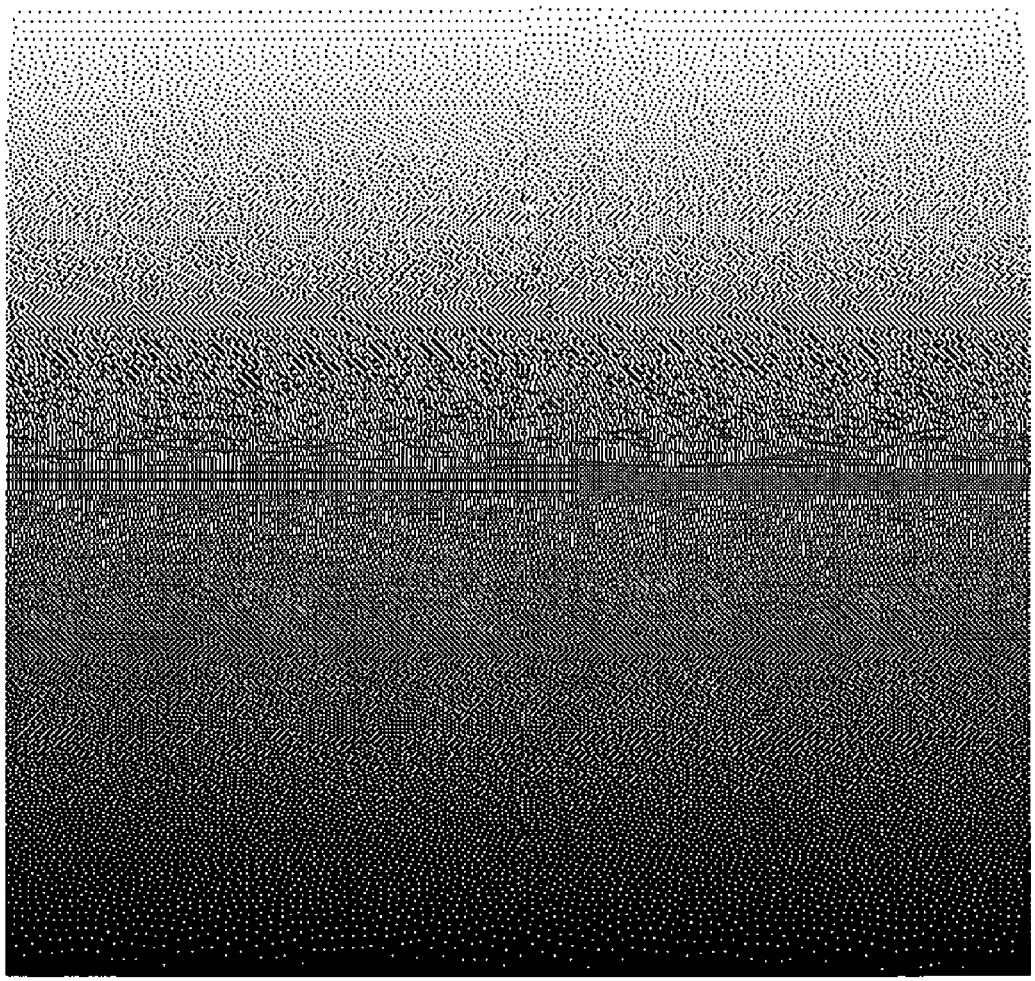
FIG. 8 is an illustrative example of the results of processing an image in accordance with the method illustrated in FIG. 7.

More specifically, the alternatives shown in FIGS. 6 and 7 respectively illustrate processing in accordance with the steps described. In FIG. 6, the padded variation includes a first padding region 618 that is comprised of stored data from the prior band and that is further added to the data of Band 2 (comprised of regions 322 and 320). FIG. 7 illustrates the variation where the right side does not overlap to the left (Band 2 is comprised only of region 320) and padding includes previously processed data from the prior band, for example, the first few scan lines of data are used to produce stored information relating to region 712. Then, the processed (multi-bit) data from the first band (region 712) is provided as an input (padding region 722) for the processing of the second band. In accordance with the variation of FIG. 7 padding may be done all the way around the first band and padding all sides but the left one for the second band. It will be appreciated that padding size and overlap size may be limited in size, for example, maintained relatively small to accommodate hardware that can only process scanlines of limited length. In one embodiment the pad size was on the order of 32 pixels and overlap size was about 128 pixels. The resulting image obtained in accordance with the embodiment and variation illustrated in FIG. 7 is illustrated in FIG. 8.

The following embodiment represents a further improvement over the embodiments set forth above. In what follows, a specific embodiment for stitching together error diffused images is described in detail relative to FIGS. 9 and 10. The image is assumed to be divided in equally or unequally overlapping areas as previously set forth in the other embodiments described above. Once again, a large image is divided into a number of unequally, or equally, overlapping segments called bands as previously illustrated in FIG. 2. The following method may also be employed with padding as in the aforementioned systems and methods or any other combination of padding.

With reference to the figures, the embodiment includes the following processes:

1. Error diffusing the two overlapping bands (Bands 1 and 2 of FIG. 9); and
2. Selecting an area common to both error diffused bands (for example region 962 in Band 1 and region 972 in Band 2) and, as illustrated in more detail in FIG. 10, processing regions 962 and 972 to produce the corresponding resultant area (region 992) of the resulting image 950. The image area corresponding to regions 962, 972, and 992 is marked as AREA X in FIG. 9.

Figure 10:
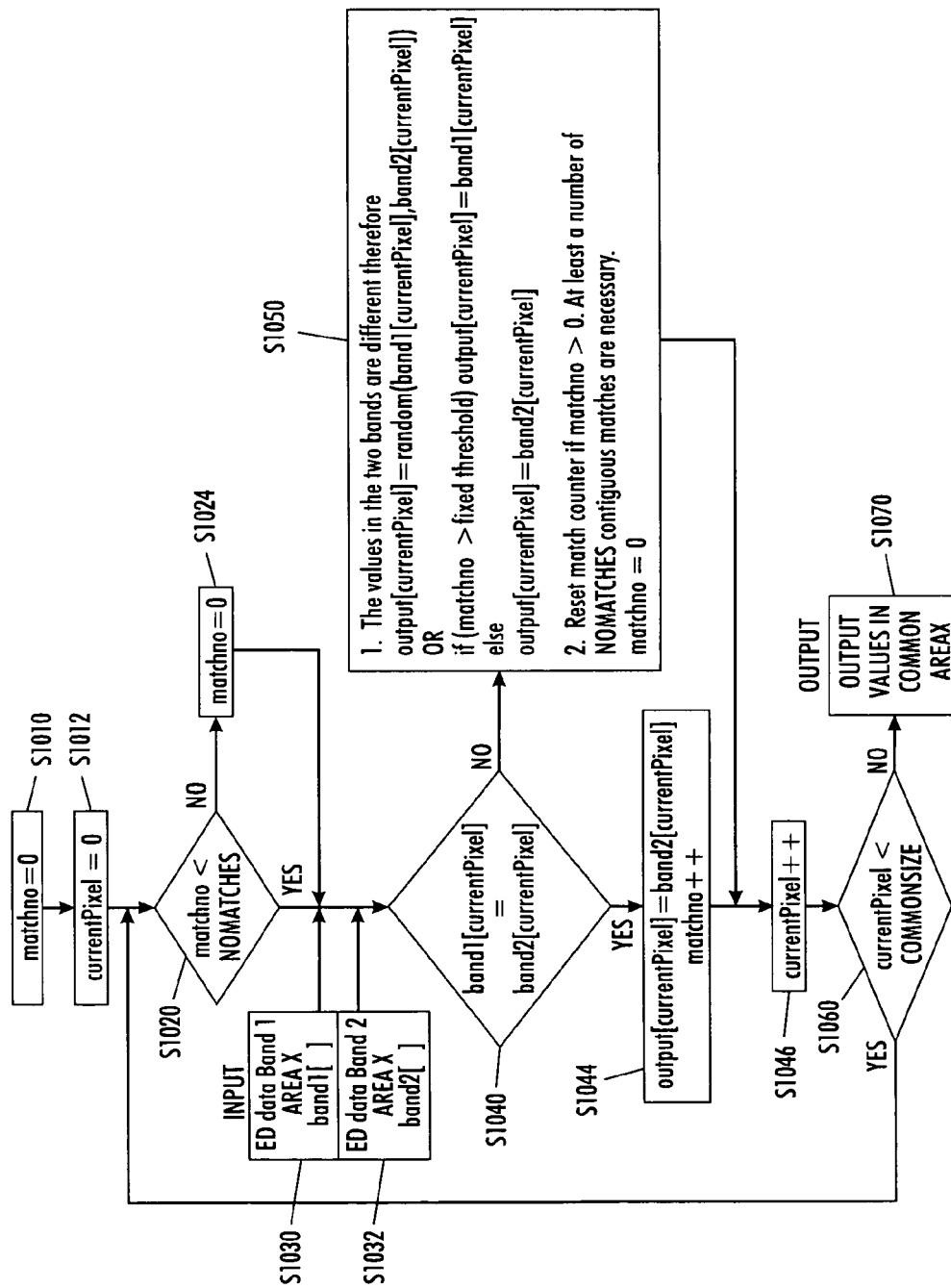

More specifically, FIG. 10 presents a number of processing alternatives to arrive at area 992 values, including:

a. Selecting the final value in this common area randomly from one of the bands (areas 962 or 972), or
b. conducting a template matching approach, or
c. a combination of a and b, for example, if there is no template match, then randomly choosing the value, or
d. using the left band data until there is a match then use right band data so as to produce a "zig-zag" response that switches at the matches.

Specifically, FIG. 10 illustrates a flowchart for completing the described operations. At S1010, S1012, the initial variables (matchno, currentPixel) are reset to zero. Next, at S1020, a test is conducted to determine if the variable matchno corresponding to the number of consecutive matches found is less than a pre-defined NOMATCHES value (for example, a value of 2). If matchno is not less, then it is reset at S1024. The, input of the error diffused image bands in AREA X is received in S1030 and S1032, and test S1040 is conducted to compare the corresponding pixel values in AREA X of each band. In the event the pixel values are a match (YES), processing continues at S1044, where the matchno variable is incremented to indicate a matching pixel and the output is selected from the second band. Subsequently, the currentpixel counter is incremented to assure the process continues a following iteration with a subsequent pixel (S1046).

Figure 9:
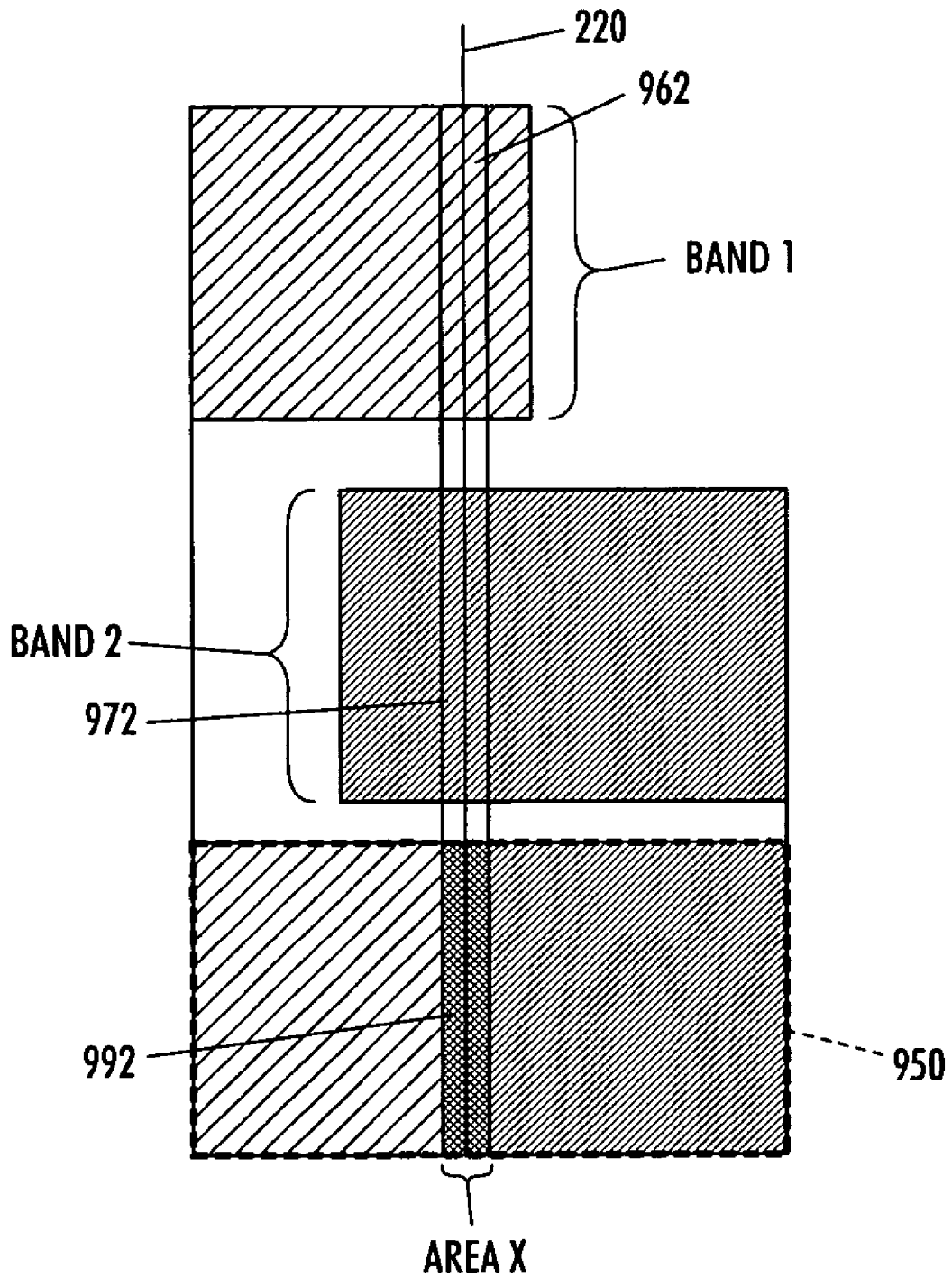
FIGS. 9-10 are exemplary views of alternative embodiment of the processing methods disclosed herein.

If no match is detected when the corresponding pixels in AREA X of the bands are compared at S1040, processing continues at S1050. In S1050, the values of the pixels are acknowledged as different and either a random value is generated as the output pixel ((a) above), or depending upon the magnitude of the matchno variable, the corresponding value from the AREA X of the first band or AREA X of the second band is output. Subsequently, the matchno variable is reset and processing continues at S1046 with the incrementing of the curentPixel counter. Next, at S1060, the size of the currentPixel counter is checked against a predetermined value that represents the size of the common area (AREA X). If the entire area has not been processed, the method continues at S1020. Otherwise, as indicated by S1070, processing is complete and the resultant image is generated using the values produced as a result of the steps indicated above, and these values are output for the common area 992 (FIG. 9).

Figure 11:
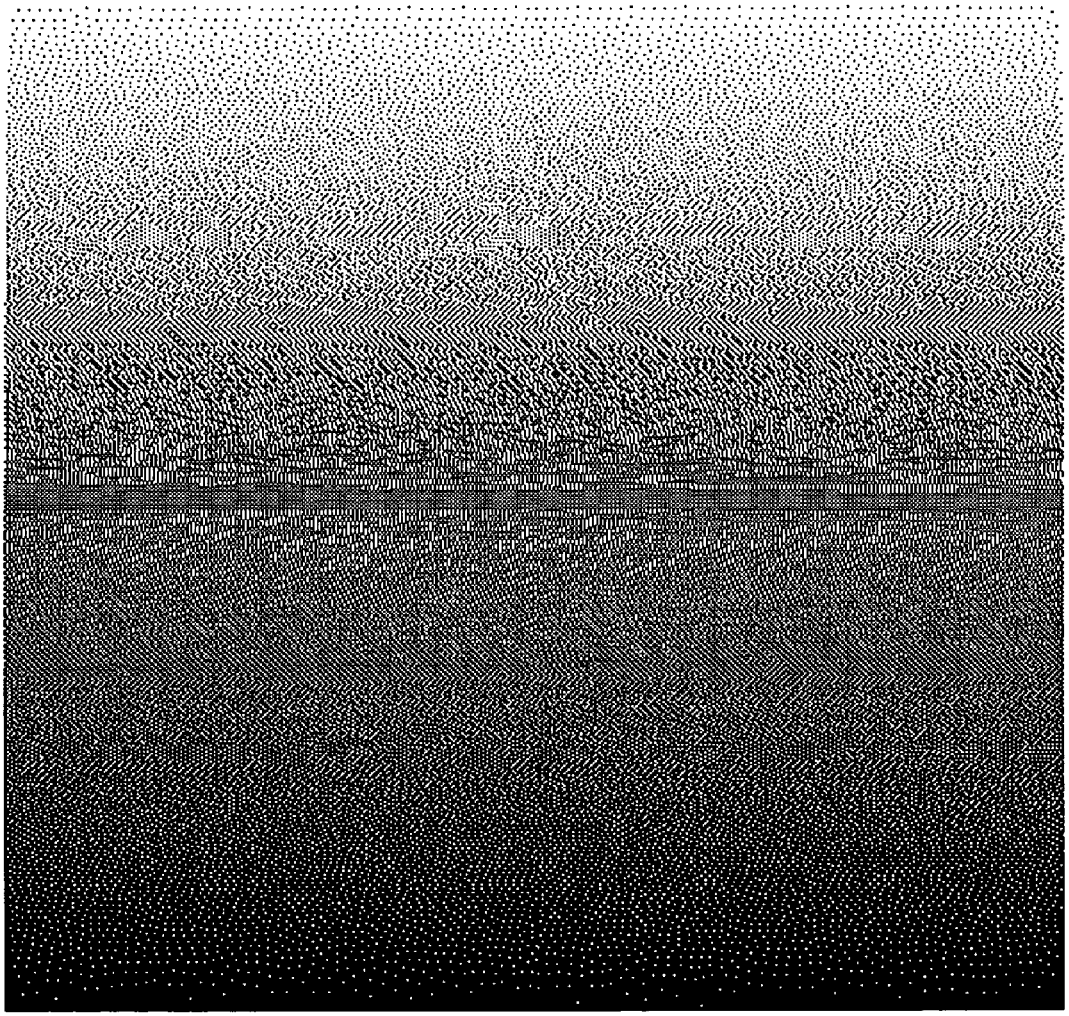
FIG. 11 is an illustrative example of the results of processing an image in accordance with the method illustrated in FIGS. 9-10.

In all the methods described herein, it is further contemplated that, as an option, the number of 1's and 0's is counted in both adjacent bands, and the ratio of 1's and 0's is maintained in the final output. It will be appreciated that in general this method of operation will also maintain a desired level of grayness in the final image. Referring also to FIG. 11, there is depicted a final image that is the result of processing in accordance with the method set forth in FIG. 10. Furthermore, the template matching of step (b), above, can be accomplished in a number of ways and is not simply limited to the manner in which described.

The various embodiments disclosed herein are not restricted to wide format images only. Processing of regular sized images in software can be improved by using the methods described above. It will be appreciated that various of the above-disclosed and other features and functions, or alternatives thereof, may be desirably combined into many different systems or applications. Also that various presently unforeseen or unanticipated alternatives, modifications, variations or improvements therein may be subsequently made by those skilled in the art which are also intended to be encompassed by the following claims.

What is claimed is:

1. A method for processing an image, comprising:
    receiving the image to be processed and storing the image in memory;
    dividing the image into bands, each band including a plurality of pixels from a plurality of scanlines;
    padding each band along at least an edge with additional non-zero data not found in the band;
    processing at least a portion of the bands in parallel, using multiple image processing channels, to produce processed bands; and
    recombining the processed bands to produce a processed image.

2. The method of claim 1, wherein padding each band comprises selecting data from an adjacent image band to effectively overlap adjacent image bands.

3. The method of claim 1, wherein the padding is accomplished using a pre-defined data pattern.

4. The method of claim 3, wherein the pre-defined data pattern comprises a uniform gray image value.

5. The method of claim 3, wherein the pre-defined data pattern comprises a pattern of mid-gray image values.

6. The method of claim 1, wherein padding comprises redefining image values along a common boundary shared by adjacent bands.

7. The method of claim 6, wherein redefining image values comprises selecting from image values along the common boundary.

8. The method of claim 7, wherein the selection is randomly performed from the values on both sides of the common boundary.

9. The method of claim 1, wherein dividing the image into bands comprises producing a plurality of unequally overlapping bands from the image data.

10. The method of claim 1, wherein recombining the processed bands to produce a processed image comprises selecting processed image values along a common boundary shared by adjacent bands.

11. The method of claim 10, wherein selecting processed image values comprises randomly selecting the image values from areas adjacent the common boundary shared by adjacent bands.

12. The method of claim 10, wherein selecting processed image values comprises identifying matching image values in areas adjacent the common boundary shared by adjacent bands, and upon detection of each match altering the area in which the image values are selected for output.

13. The method of claim 1, wherein a plurality of scanlines of the first band are processed prior to processing of the second band, and where output generated by processing of the plurality of scanlines of the first band is used as an input to the processing of the second band.

14. A method, operating on an image processor, for processing a large-format image stored in memory, comprising:
    dividing the large format image into N overlapping segments called bands using an image splitter, each band including a plurality of adjacent pixels from a plurality of adjacent scanlines;
    padding each of said N bands, along at least an edge, with additional non-zero data not found in said band;
    parallel processing each of said N bands using a plurality of channels in the image processor to produce N processed bands, wherein said N processed bands each include processed image values derived from the additional image data; and
    recombining the processed bands from said plurality of channels while eliminating overlapping regions thereof to produce a processed image.

15. The method of claim 14, wherein padding each band comprises selecting data from an adjacent image band to effectively overlap adjacent image bands.

16. The method of claim 14, wherein a plurality of scanlines of a band are processed prior to processing of a subsequent band, and where output generated by processing of the plurality of scanlines of the band is used as an input to the processing of the subsequent band.

17. A system for processing an image, comprising:
    an image splitter for dividing the image into overlapping bands, each of said bands including a plurality of pixels from a plurality of scanlines and being assigned to one of a plurality of processing channels;
    a preprocessing module, within each channel, for padding each band along at least an edge with additional data not originally found in the band;
    an image processor for processing at least a portion of the image data in each band in parallel to produce processed bands; and
    an image stitcher for recombining the processed bands to produce a processed image.

18. The system of claim 17, wherein said image splitter is capable of duplicating at least a portion of the data for an image band, and thereby divide the image into a plurality of overlapping bands, wherein image data found in one band is at least partially duplicated in an adjacent band.

19. The system of claim 17, further including an image data generator, said generator producing image data in accordance with a predetermined characteristic for addition to each image band within a particular channel.

* * * * *